Oct. 15, 1963  R. W. ANDERSON ETAL  3,106,943
GRID MAKING MACHINE
Filed May 18, 1959  3 Sheets-Sheet 3
Fig. 4.
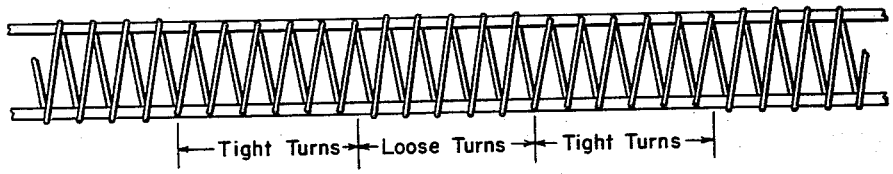
Fig. 5.
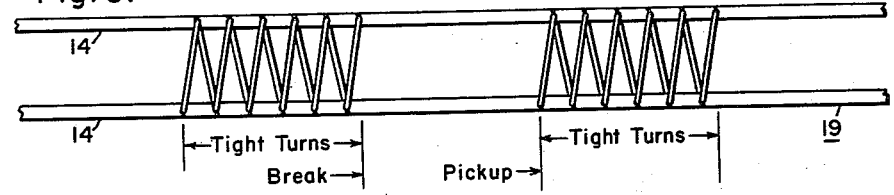
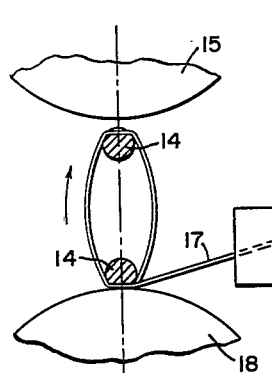
Fig. 6A
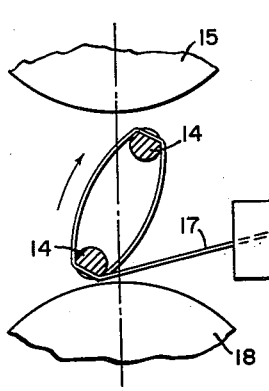
Fig. 6B.
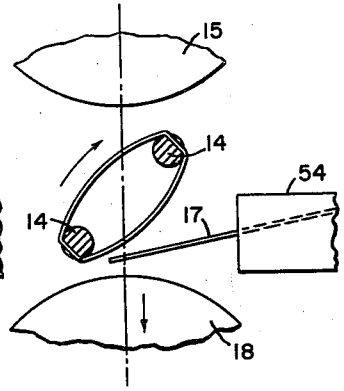
Fig. 6C.
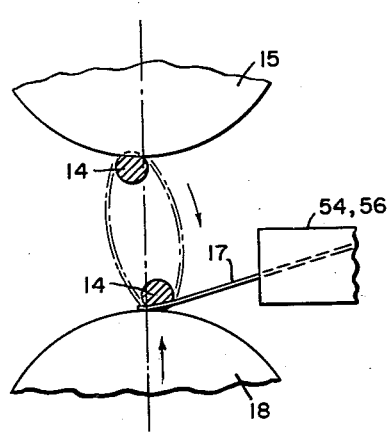
Fig. 7A.
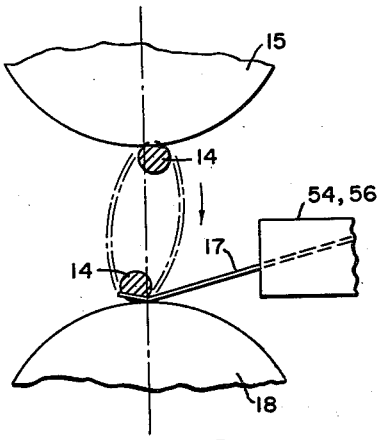
Fig. 7B.

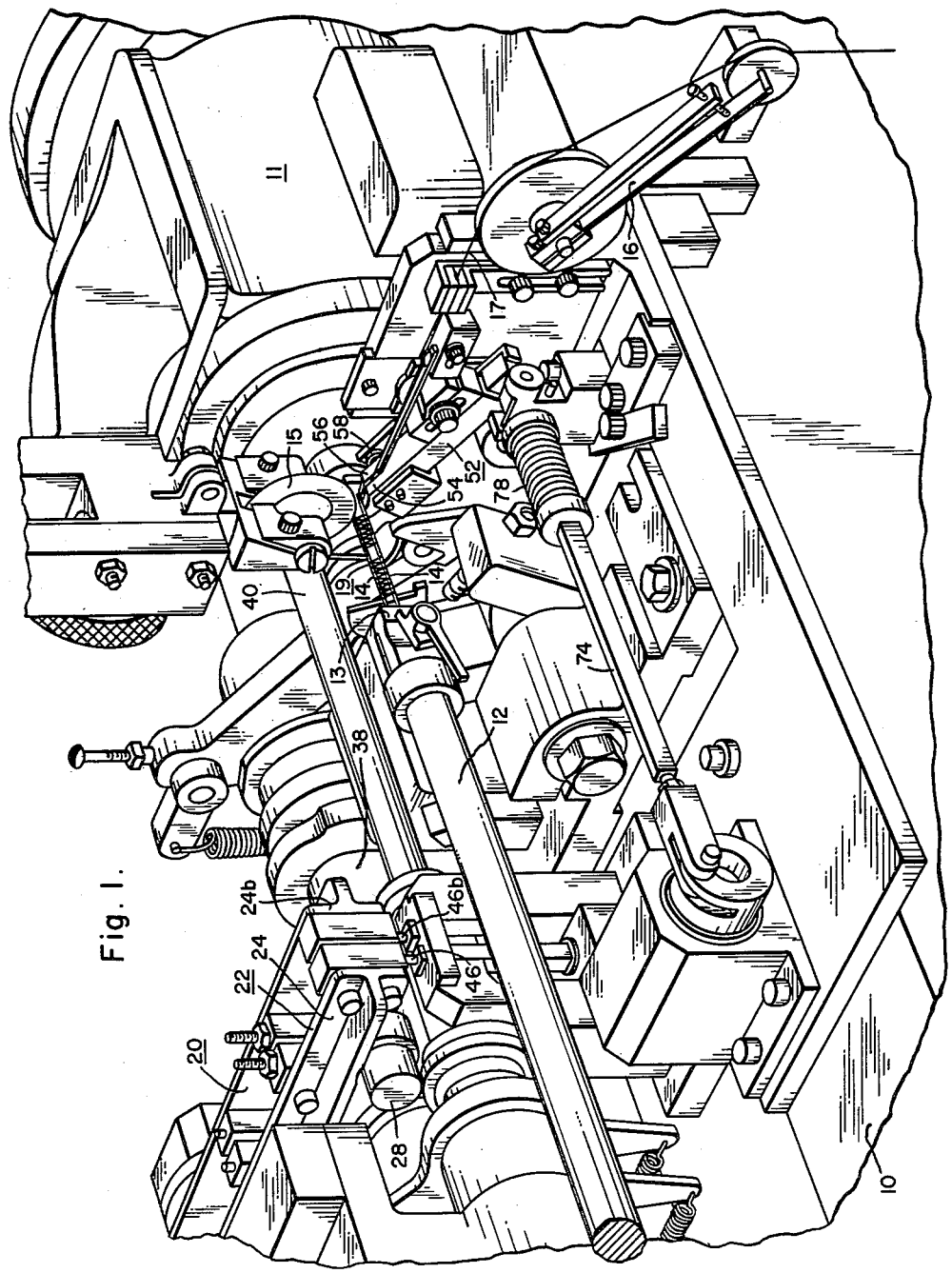

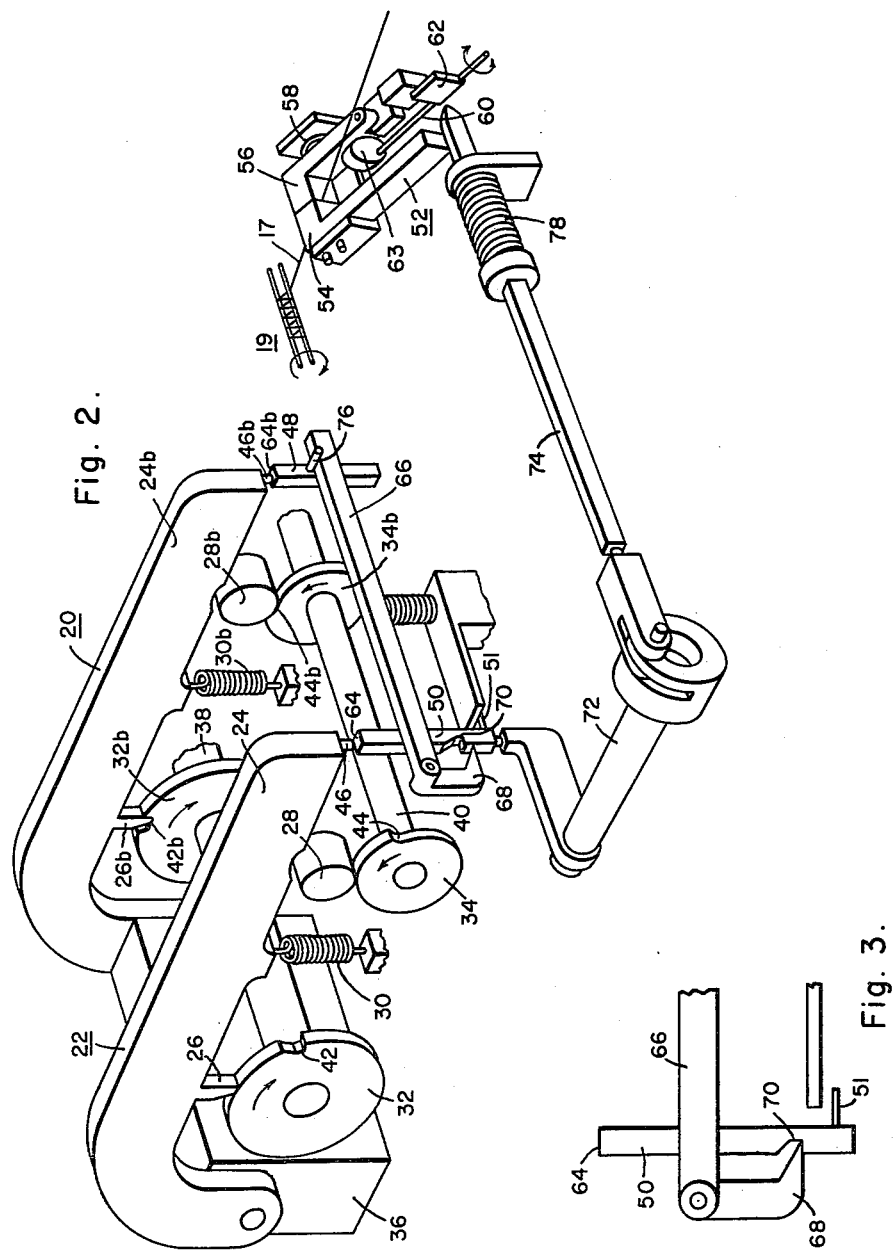

United States Patent Office 3,106,943
Patented Oct. 15, 1963

3,106,943
GRID MAKING MACHINE
Richard W. Anderson, Horseheads, and Ernest F. Smart and Goliardo Miale, Bath, N.Y., assignors to Westinghouse Electric Corporation, East Pittsburgh, Pa., a corporation of Pennsylvania
Filed May 18, 1959, Ser. No. 814,004
2 Claims. (Cl. 140—71.5)

This invention relates to the manufacture of grid electrodes for electron discharge tubes, and more particularly to a method and automatic machinery for making grid electrodes for electron tubes.

A grid structure of the type to which the present invention relates usually comprises a pair of relatively heavy wires which are generally known as support wires or side rods, about which is wound a relatively thin wire, termed a lateral wire or a grid wire. The grid wire is secured to the support wires by a suitable means such as welding or notching and peening.

A grid for an electron tube is usually formed so that the turns of the grid wire are terminated a short distance from the ends of the support wires so that the ends of the support wires may be readily attached to the supporting structure within the tube. Since the grid is physically relatively short, the grid wires are usually wound continuously on the support wires into grid strips, such as the one shown in FIG. 4, which comprise alternate lengths of the wanted or tight turns of grid wire which are secured to the support members and the unwanted or loose turns of grid wire which are not usually secured to the support wires.

The grid strips are cut apart into the individual grid electrodes and the unwanted turns of grid wire are removed from the individual grid electrodes producing a grid having wanted turns of grid wire attached to the support wire and having the ends of the support wire free of grid wire.

Several methods have been devised to remove the unwanted turns of grid wire from the support wire, such as manually severing the wire, or burning off the unwanted turns by means of an electric spark, but each of these methods requires an additional operation to remove the unwanted turns of grid wire from the support wire.

The cost of making wound grids represents an appreciable percentage of the total cost of manufacturing electron tubes. This is due largely to the low degree of mechanization with attendant high losses due to damage resulting from handling and processing. Accordingly, it is the general object of this invention to provide a method and apparatus for automatically winding grids at high speed, such that no grid wire is wound on the end portions of the support members and in which grids suitable for use in a modern electron tube can be produced without the use of an operation for removing unwanted grid wire from the grid electrode.

It is another object of this invention to provide apparatus and method for automatically manufacturing grid electrodes for an electron tube.

A further object of this invention is to provide an apparatus and method for winding a grid strip such that grid wire is not wound on certain predetermined portions of the support member.

An additional object of this invention is to provide automatic accurately timed means to break the grid wire at a predetermined time, and a second accurately timed means for picking up the grid wire and attaching it to a support member to being another grid.

An auxiliary object of this invention is the provision of a novel automatic machine and method for rapidly and efficiently making grid electrodes suitable for use in an electron tube.

A supplementary object of this invention is to provide a method and apparatus for breaking grid wire by stopping the feed of grid wire while the spindle continues to rotate thereby stretching the wire to the breaking point and providing accurately timed means to insure that the break occurs at the support member.

These and other objects of this invention will be apparent from the following description, taken in accordance with the accompanying drawing throughout which like reference characters indicate like parts, which drawings form a part of this application and in which:

FIGURE 1 shows a perspective view of the invention as attached to a standard grid lathe.

FIGURE 2 shows a diagrammatic schematic view of the invention.

FIG. 3 shows a schematic view of the latch mechanism.

FIG. 4 shows a conventional wound grid strip.

FIG. 5 shows a grid strip wound according to this invention.

FIGS. 6A, 6B and 6C show a diagrammatic view of the action of breaking the grid wire in the progressive steps.

FIGS. 7A and 7B show a diagrammatic view of the pickup of the grid wire.

Briefly, in a preferred embodiment of this invention, grid strips are wound in the conventional manner throughout the tight turn section. When the last tight turn has been peened into the support member, the lateral or grid wire is broken close to the support member and the normal rotation and longitudinal travel of the support members continues without any loose turns being wound until the grid wire is picked up and peened into the support member at the beginning of winding the first tight turn of the next grid. This mode of operation is continued throughout the strip and a grid strip 19 such as that shown in FIG. 5 results.

The invention comprises in general a precision system that takes the form of an attachment that can be easily added to a standard rotary grid lathe. With specific reference to the particular form shown in the drawing, the grid making machine embodying this invention is constructed similar to a lathe and comprises a bed plate 10 upon which is supported at one end a headstock 11, and at the other end a tailstock (not shown) is provided. A rotary head comprising a main spindel is driven by suitable drive means. A tubular drawbar 12 is provided at one end with a strip clamp 13 and on its other end with a half-nut or split nut (not shown). The half-nut may be opened and closed by means of a handle. A lead screw is provided in which one end is rotatably mounted in the tailstock and the other end is positioned to engage the half-nut. Each support member or side rod wire 14 is automatically fed in a continuous length from a spool (not shown) carried in a yoke on the outer end of the head spindle. The support members pass through channels extending longitudinally through the head spindle. A mandrel is secured to the end of the head spindle and grooves are provided in the mandrel for the support members. A notching wheel 15 is supported from a suitable bracket from the headstock immediately above the mandrel. A suitable lateral wire tension and guide system 16 is also provided.

The winding operation is started by securing the support members 14 by means of the clamp 13 on the drawbar 12. The half nut is closed on the lead screw so that as the lead screw retreats due to the rotation of the drawbar the support members are drawn through the channels in the head spindle and along the opposite edges of the mandrel. The notching wheel 15 is mounted in such a position that its periphery cuts a notch in each support member as the support member 14 is carried under the notching wheel 15 by the rotation of the mandrel. The grid wire is secured in each of these notches in the support member by a peening wheel 18 as the support member 14, and the grid wire 17 is carried over the peening wheel 18 by the rotation of the mandrel.

For purposes of description, the wire break and pickup attachment may be divided into three basic component sections which co-act to perform the stated objects. These component sections are: the break arm and pick-up arm assembly, the latch and push rod assembly and the lateral wire guide finger gripper assembly.

The break arm assembly 20 and the pickup arm assembly 22 provide timed mechanical impulses for actuation and control of the component sections mentioned above. Both the break arm and the pickup-arm assemblies are basically identical units each of which comprises an overhead arm 24 which includes a pin follower 26 and a cam follower 28, an adjustable tension spring 30, a coarse cam 32 and a fine cam 34. For clarity of description, the components associated with the break arm 20 which are substantially identical to the corresponding components of the pickup-arm 22 have been given the suffix b. The main difference between the break-arm assembly 20 and the pckup-arm assembly 22 is the relative settings of the fine cams 34 and 34b and the coarse cams 32, and 32b. In the embodiment shown, the overhead arms are pivotally attached to an upright member 36 which is secured to the bed plate of the grid lathe and extend across both the rear shaft 38 and the front shaft 40 of the grid lathe at substantially a right angle. The coarse cams 32, 32b are attached to the rear shaft 38 and driven at the rate of one revolution for each complete grid by means of suitable gearing from the main spindle. The fine cams 34, 34b are attached to the front shaft 40 of the grid lathe which makes one complete revolution for each complete turn of the lateral wire. The front shaft 40 is driven by one to one gearing from the main spindle in the head stock of the grid lathe and revolves at a considerably greater speed than the rear shaft (60 to 1 is typical). A pin follower 26, 26b is provided on each overhead arm 24, 24b at a point opposite the coarse cam 32, 32b and this pin follower 26, 26b is held in contact with the coarse cam 32, 32b by the tensioning spring 30, 30b. Each coarse cam 32, 32b is provided with a notch 42, 42b and when the rear shaft 38 rotates to a position such that the pin follower 26, 26b which is provided on the overhead arm 24, 24b is positioned opposite the notch 42, 42b in the coarse cam 32, 32b the pin followers 26, 26b fall into the notch 42, 42b due to the bias of the tensioning spring 30, 30b. Each fine cam 34, 34b is provided with a rapid drop contour portion 44, 44b. A roller type follower 28, 28b is provided on the overhead arm 24, 24b opposite the fine cam 34, 34b. When the pin follower 26, 26b falls into the notch 42, 42b on the coarse cam 32, 32b the roller follower 28, 28b makes contact with the fine cam 34, 34b. When the front shaft 40 rotates to the position in which the roller follower 28, 82b falls into the drop portion 44, 44b on the fine cam 34, 34b the overhead arm 24, 24b falls and the striking pin 46, 46b which is attached to the end of the overhead arm 24, 24b imparts an impact to the adjacent slide member 48 or 50. In the case of the break-arm operation, the impact causes a downward movement of the unlatch slide member 48 which results in the disengagement of the locking protrusion 68 from the latch slide member 50. When latch slide 50 is released it is moved upward by the bias of spring 78. The upward travel of slide 50 is limited by a fixed stop pin 51. By means of the latch slide 50 and push rod assembly the tension is released at the lateral wire guide finger gripper assembly and the movable gripper guide 56 is allowed to close against the fixed gripper guide 54 due to the force exerted by spring 58 thereby stopping the feed of lateral wire 17. However, the main spindle of the grid lathe to which is attached the winding mandrel continues to rotate. This causes that portion of the lateral wire between the gripping fingers 54, 56 and the support members 14 which are supported by the winding mandrel to be stretched to the breaking point. Proper timing of all elements locates the break at the support member 14. The stretched but unbroken portion of lateral wire 17 remains between the gripping fingers 54, 56 in a position such that it can be picked up when winding of lateral turns is to be resumed. A diagrammatic view of this break action is shown in FIGS. 6A, 6B, and 6C in three progressive steps. The break is accomplished at the support member 14 due to the sharp corner of the notch; and, immediately after the break is accomplished, the peening wheel 18 is moved away. The grid strip 19 continues to be advanced due to the action of the lead screw, but no lateral turns are wound.

The pickup action is shown in FIG. 7A and FIG. 7B. At the instant that winding of lateral wire 17 is to be resumed the peening wheel 18 is moved up, causing lateral wire 17 to be peened in the support member 14 to start another grid and the gripper finger 56 is instantly opened, allowing wire 17 to feed.

The latch and push rod assembly is composed of a system of levers and push rods which serve to transfer timed impulses from the breakarm and pickup-arm assemblies to the lateral guide gripper assembly.

In the embodiment shown, the latch slide member 50 and the unlatch slide member 48 are slidably mounted in guide slots in the slide retainer housing which is rigidly attached to the bed plate of the grid lathe. The unlatch slide member 48 comprises an elongated rectangular steel member having a flat striking surface 64b on one end and a striking pin 76 located on one side intermediate the ends. The latch slide member 50 comprises an elongated rectangular member having a flat striking surface 64 on one end, a triangular shaped notch 70 in one side and a stop pin 51 on the opposite side intermediate the ends. A rigid L-shaped locking member 66 is provided which is pivotally mounted at the corner portion of the L. The locking lever 66 is mounted on the slide retainer housing such that the long arm of the L is positioned adjacent the striking pin 76 on the unlatch slide member 48, and the short end of the L is provided with a triangular shaped protrusion 68 that is adapted to cooperate with the notch 70 provided in the latch slide member 50 to hold the latch slide member in position during the period when lateral wire is being wound on the support members. The locking protrusion 68 is biased to the locking position by spring biasing means. FIG. 3 shows the latch in the engaged or winding position. FIG. 2 shows the mechanism at the time the lateral wire will break. When the striking pin 46 on the pick-up arm 24 strikes the latch slide member 50, the latch slide member is depressed and the triangular shaped protrusion 68 on the short leg of the locking member 66 falls into the cooperating notch 70 on the latch slide member 50 thereby locking the member in the depressed position. The act of latch slide member 50 being depressed imparts a motion to the long arm of a bell-crank lever 72. The short arm of the bell-crank lever 72 is attached to one end of a push rod 74. The motion is transmitted to this push rod 74 which acts to open the lateral wire gripper finger 56 and allows the lateral wire to flow freely. Any end play in the lever and push-rod assembly is taken up by means of springs 78.

The lateral wire guide finger gripper assembly 52 consists of four basic parts: the fixed wire guide finger 54, the movable gripper guide or the pivoting finger 56, the adjustable spring unit 58 and a pivot rod 60 which extends through the center of the lateral wire gripper assembly 52. The pivot rod 60 has a flag-shaped projection 62 on the exposed end, and the opposite end has been shaped to produce a cam section 63 so as to actuate the pivoting finger 56. The function of the gripper assembly is to insure that the lateral wire is correctly guided and positioned in line with the side rod notches. The gripper assembly also provides a means for restricting the flow of lateral wire by gripping the lateral wire to accomplish the wire break. In addition, the gripper assembly supports the lateral wire, during the grid winding cycle where no lateral wire is being wound, in a position to be picked up by the first peen of the next grid.

The operation of the break and pickup attachment is best understood when described in full operation in conjunction with a grid lathe. In the following description, only the activities taking place during the winding operations which are directly connected with the wire break and pickup attachment will be described. The grid lathe is set up in the conventional manner and the necessary adjustments made to the wire break and pickup assembly. Upon starting the grid lathe, the grid is wound in conventional fashion throughout the tight turn section of the grid. The movable gripper guide or pivoting finger 56 is in the open position during the winding of the tight turn section and the coarse cam 32b completes that portion of one revolution proportional to one tight turn section of one grid strip. The pin follower 26b, attached to the overhead arm 24b, falls into the notch 42b provided on the surface of the coarse cam 32b allowing the roller follower 28b attached to the break arm 24b to contact the fine cam 34b. Revolution of the fine cam allows the roller follower 28b to drop into the drop portion 44b of the fine cam 34b. At this instant, the striking pin 46b contacts the unlatch slide member 48 and depresses it. The striking pin 76 attached to the unlatch slide 48 strikes long arm of the locking member 66 and causes the latch slide 50 to be unlocked. The latch slide 50 moves up when it is unlatched due to the force of the biasing spring 78 which is transmitted through the bell crank lever 72. The force of the biasing spring 78 also causes the push rod 74 to move away from flag portion 62 on the end of the pivot rod 60, which in turn allows the movable gripper 56 to be closed by spring 58 and grip the lateral wire. Since the lathe continues to rotate, this action breaks the lateral wire at the last notch and peen of the lateral wire in the support member. It should be emphasized that the total elapsed time for this break action is of the order of one one-thousandth of a second.

The end of the lateral wire remains in a position just past the vertical axis of the grid being wound (FIG. 6C) which puts it in the desired position to be picked up by the first notch and peen of the next grid (FIG. 7A). The push rod 74 continues out of contact with the flag portion 62 of the pivot rod 60 throughout the unwanted turn area of the grid, the length of which is determined by the settings of the coarse cam and fine cam of the pickup arm. The setting of the coarse cam and fine cam of the pickup arm must be accurately made since a tail of wire will be left at the start of the next grid if the timing is too early or the action will be too late for peening the lateral wire into the support member if the timing is too late. The tail length must be controlled to about .015 inch or the purpose of this attachment will be defeated since an additional operation will be required to remove the excess tail length. The pickup of the lateral wire to start the next grid is accomplished in the same manner as described above and this cycle of operation is repeated for each unwound and wound portion throughout the grid strip. When the pickup of the lateral wire to start the next grid is to occur, the pin follower 26 attached to the pickup arm 24 falls into the notch 42 provided in the surface of the coarse cam 32 allowing the pickup arm 24 to drop so that the roller follower 28 attached to the pickup arm 24 contacts the fine cam 34. The front shaft 40 rotates until the drop portion 44 of the fine cam 34 contacts the roller follower 28, at which time the pickup arm 24 is allowed to drop further, and the striking pin 46 attached to the end of the pickup arm 24 thereby strikes the striking surface 64 of the latch slide 50 and forces it downwardly. The roller follower 28 is allowed to contact the fine cam 34 only for a time less than one revolution of the fine cam 34 for each wound grid because only a single impulse is allowable for either the break or pick-up action. This single impulse is controlled by the geometry the pin follower 26 and the notch 42 in the coarse cam 32. When the latch slide member 50 moves downwardly, the triangular shaped protrusion 68 on the locking member 66 falls into the cooperating notch 70 on the latch slide 50 thereby holding the latch slide in the depressed position. The motion of the latch slide member is transferred through the bell crank lever 72, the push rod 74, and the pivot rod 60 to cause the lateral guide finger 56 to open and allow a free flow of lateral wire to the side rods. This is accomplished through the system of levers in which the push rod 74 contacts the flag portion 62 of the pivot rod 60. The pressure exerted by the push rod 74 upon the flag portion 62 causes the pivot rod 60 to revolve, thus opening the movable gripper guide finger 56 due to the action of the cam portion 64 (total travel of 74 is about .015 inch). Just previous to this action, the appropriate support member has been notched by action of the notching wheel.

Simultaneously with the opening of the movable finger 56, the peening wheel is activated, which causes the lateral wire end to be peened into the support member to start the winding of a grid. Although the action of the mechanism has been described in detail, it should be emphasized that the total elapsed time for the entire pickup operation just described is also about one one-thousandth of a second. Also, since the diameter of the lateral wire is usually about .001 to .004 inch, an opening of .002 to .005 inch between the lateral guide fingers 54 and 56 is sufficient to allow a free flow of lateral wire to the side rods.

While the present invention has been shown in one form only, it will be obvious to those skilled in the art that this is not so limited, but is susceptible of various changes and modifications without departing from the spirit and scope thereof.

We claim as our invention:

1. A grid making machine comprising a main spindle means for rotating said main spindle, a mandrel operatively associated with said main spindle, a pair of support members held in spaced relation by said mandrel, means for moving said support members longitudinally, means comprising a pair of spaced jaws for guiding grid wire to said support members whereby upon said rotative and longitudinal movement thereof said grid wire is wound therearound, means for securing said grid wire at each of its points of contact with said support members, means automatically operable for breaking said wire at a predetermined time, said breaking means comprising a coarse timing means and a fine timing means, said coarse timing means being operatively associated with said main spindle, said fine timing means being operatively associated with said main spindle and said coarse timing means, said break accomplished by transfer of an impulse from said timing means to close said jaws of said grid wire feeding means to stop the flow of said grid wire whereby the grid wire is stretched to the breaking point due to the continued rotation of said main spindle.

2. A grid making machine comprising a main spindle, a mandrel operatively associated with said main spindle, a pair of support members held in spaced relation by said mandrel, and means for rotating said mandrel to rotate said support members, means for moving said support members longitudinally, means for guiding grid wire to said support members whereby upon said rotative and longitudinal movement thereof said grid wire is wound therearound, means for securing said grid wire at each of its points of contact with said support members, means for breaking said grid wire at a predetermined time, said breaking means comprising first and second cam members, each of said cam members having an indentation in its periphery, the first of said cam members mounted on a first shaft operatively associated for rotation at a first speed, the second of said cam members mounted on a second shaft operatively associated for rotation at a substantially faster speed than said first cam member, an elongated arm fixed at one end, said arm having a first and second cam follower, said first cam follower held in contact with said first cam member by spring means, the free end of said arm adapted to move a first distance when said first cam follower engages the indentation in the periphery of said first cam and to move a second distance when said second cam follower engages the indentation in the periphery of said second cam whereby said arm imparts a movement which is transmitted by a system of levers to close said grid wire feeding means whereby said grid wire between said grid wire feeding means and said support members is stretched to the breaking point, said break of said wire occurring adjacent said support member.

References Cited in the file of this patent

UNITED STATES PATENTS

| 1,978,108 | Howald et al. | Oct. 23, 1934 |
| 2,441,228 | Schneider et al. | May 11, 1948 |
| 2,759,499 | Gartner | Aug. 21, 1956 |

FOREIGN PATENTS

| 161,001 | Australia | Feb. 8, 1955 |